(12) United States Patent
Hofner

(10) Patent No.: US 6,934,880 B2
(45) Date of Patent: Aug. 23, 2005

(54) FUNCTIONAL FAIL-OVER APPARATUS AND METHOD OF OPERATION THEREOF

(75) Inventor: Robert Hofner, Ashdod (IL)

(73) Assignee: Exanet, Inc., Santa Clara, CA (US)

( * ) Notice: Subject to any disclaimer, the term of this patent is extended or adjusted under 35 U.S.C. 154(b) by 525 days.

(21) Appl. No.: 09/989,231

(22) Filed: Nov. 21, 2001

(65) Prior Publication Data

US 2003/0097610 A1 May 22, 2003

(51) Int. Cl.[7] .............................................. G06F 11/00
(52) U.S. Cl. .............................. 714/10; 714/4; 714/11; 714/25
(58) Field of Search .......................... 714/4, 6, 25, 10, 714/11, 12, 13

(56) References Cited

U.S. PATENT DOCUMENTS

| | | | |
|---|---|---|---|
| 5,027,269 A | 6/1991 | Grant et al. ................. | 364/200 |
| 5,117,352 A | 5/1992 | Falek ........................... | 395/575 |
| 5,341,372 A | 8/1994 | Kirkham .................... | 370/85.8 |
| 5,790,775 A | 8/1998 | Marks et al. .......... | 395/182.07 |
| 5,875,290 A | 2/1999 | Bartfai et al. .......... | 395/182.11 |
| 5,964,886 A | 10/1999 | Slaughter et al. | |
| 5,978,933 A | 11/1999 | Wyld et al. | |
| 5,987,621 A | 11/1999 | Duso et al. ..................... | 714/4 |
| 6,012,150 A | 1/2000 | Bartfai et al. .................. | 714/4 |
| 6,061,750 A | 5/2000 | Beardsley et al. ............. | 710/74 |
| 6,078,957 A | 6/2000 | Adelman et al. ........... | 709/224 |
| 6,119,244 A * | 9/2000 | Schoenthal et al. ............ | 714/4 |
| 6,161,191 A | 12/2000 | Slaughter et al. | |
| 6,176,733 B1 | 1/2001 | Coile et al. ................. | 439/489 |
| 6,243,825 B1 | 6/2001 | Gamache et al. .............. | 714/4 |
| 6,246,666 B1 | 6/2001 | Purcell et al. .............. | 370/221 |
| 6,324,161 B1 * | 11/2001 | Kirch ......................... | 370/217 |
| 6,519,053 B1 * | 2/2003 | Motamed et al. .......... | 358/1.16 |
| 6,564,336 B1 * | 5/2003 | Majkowski ..................... | 714/4 |
| 6,609,213 B1 * | 8/2003 | Nguyen et al. ................. | 714/4 |
| 6,701,449 B1 * | 3/2004 | Davis et al. .................... | 714/4 |
| 6,754,855 B1 * | 6/2004 | Denninghoff et al. ......... | 714/48 |
| 2002/0007468 A1 | 1/2002 | Kampe et al. | |
| 2002/0133608 A1 | 9/2002 | Godwin et al. | |

* cited by examiner

*Primary Examiner*—Robert Beausoliel
*Assistant Examiner*—Emerson Puente
(74) *Attorney, Agent, or Firm*—Sughrue Mion, PLLC

(57) ABSTRACT

A system and method for a failover system where in case of a failure of an element within the system, only that element is shutdown, rather then shutting down an entire node. The solution is of particular use in network systems, networked storage systems as well as location independent file systems.

70 Claims, 9 Drawing Sheets

FUNCTIONAL FAIL-OVER APPARATUS AND METHOD OF OPERATION THEREOF

BACKGROUND OF THE PRESENT INVENTION

1. Technical Field of the Present Invention

The present invention relates generally to systems having redundant elements for the purpose of replacing a failed element with a functional element. More specifically, the present invention relates to a class of solutions known as failover systems. These systems are targeted at ensuring the continued operation of a system when an element in the system fails. In failover systems, each element will normally have a redundant element to allow for such replacement to take place.

2. Description of the Related Art

There will now be provided a discussion of various topics to provide a proper foundation for understanding the present invention.

In modern computer data processing, separating an application program into cooperating portions and running each portion on a different processing device within a computer network improves the execution efficiency of the application program. The cooperating portions of the application program are each run as a detached process on a specific processing device. The cooperating portions may be active in a serial fashion (i.e., one at a time) or they can all be active at the same time as cooperating potions of an overall data processing operation. In addition, multiple independent programs can be running on a multi-processing unit, consuming a variety of resources from the overall system resources that are available. Any such independent program or independent sub-program is referred to as a process.

For reliable execution, each processing device running a process must function properly throughout the entire process. If a process fails due to failure of a processing device, or is otherwise unable to complete the process, it is imperative that a failure notification be made to enable a system manager to implement appropriate corrective actions. Moreover, it is desirable that certain automation and redundancy be available to allow for automatic recovery in case of failure.

Failover systems enable failure detection and perform corrective actions, if possible. Referring to FIG. 1, an example of an active-inactive failover system is illustrated. An active-active failover system will have a similar operation with both nodes performing tasks and monitoring each other for operational functionality. Failover system 100 comprises two processing devices, active node 110 and inactive node 120. Active node 110 and inactive node 120 are connected through a communication link 130. The communication link can be hardwired or can be a wireless link. Processes are executed on active node 110, while inactive node 120 is basically dormant as far as execution of processes is concerned. However, inactive node 120 monitors the process on active node 110. If inactive node 120 detects a problem in active node 110, a failover mechanism will be initiated, as follows:

1. Active node 110 is instructed to shutdown all its activities;
2. Inactive node 120 becomes the new active node and restarts or resumes all activities;
3. If possible, the former active node (node 110) becomes an inactive node of the system, or otherwise failure notification is issued.

Typically, failover systems are used for devices such as network systems, central process units and storage systems. For example, a failover system for a network system consists of two nodes: one node functioning as the active provider of Internet related services (web services, file transfer services, etc.) to the public client network, and the other node (the inactive node) monitors those services and operates as standby system. When any service on the active node becomes unresponsive, the inactive node becomes an active node and replaces the failing previously active node. Such a failover system can be implemented using virtual Internet protocol (IP) addresses. A node can be accessed through its virtual IP address or by its regular host address. In an active-active implementation, both nodes would be performing their tasks and monitoring the other node. Upon detection of any kind of failure of a node, the other node will shut down the unresponsive node and re-initiate the activities of that supposedly failed node on that other node.

A general disadvantage of these systems is the necessity to shut down the active node and transfer all activities to the inactive node. A complete shutdown, however, of the active node is not always really necessary. It would be therefore advantageous, if a failover system, upon detection of a failure, such as an unresponsive process or processes, to terminate only those parts and initiate them on the inactive node, rather then terminating all applications running on the processing device or the entire process.

SUMMARY OF THE PRESENT INVENTION

The present invention has been made in view of the above circumstances and to overcome the above problems and limitations of the prior art.

Additional aspects and advantages of the present invention will be set forth in part in the description that follows and in part will be obvious from the description, or may be learned by practice of the present invention. The aspects and advantages of the present invention may be realized and attained by means of the instrumentalities and combinations particularly pointed out in the appended claims.

A first aspect of the present invention provides a system comprising a first network node and a second network node connected via a communication link. The system further comprises a process that is capable of execution on the first network node. The system further comprises a first monitor for the process, wherein the first monitor is capable of execution on the second network node. The monitor is capable of detecting failure of the process on the first network node and causing the process to execute on the second network node. When the first monitor detects the failure of the process, the first monitor initiates a process swap, by terminating the process from execution on the first network node, and initiating the process on the second network node. Then, the first monitor initiates a second monitor on the first network node, and terminates the first monitor from executing on the second network node.

A second aspect of the present invention provides a system comprising a first plurality of network nodes connected via a first communication link, and a second plurality of network nodes connected via a second communication link (LANs). The first communication link and the second communication link are connected through a third communication link (WAN). The system further comprises a process that is capable of execution on one of the network nodes. A monitor for the process, capable of execution on one of the network nodes, is included in the system as well. The monitor is capable of detecting failure of the process and causing the process to execute on another of the network nodes. When the first monitor detects the failure of the process, the first monitor initiates a process swap by terminating the process from execution, and transferring and initiating the process on another network node. The first monitor then initiates a second monitor on the network node that is not the same node as the node to which the process was transferred. Finally, after the second monitor is operational, the first monitor terminates.

A third aspect of the present invention provides a method for operating a failover system, wherein failover does not require the termination of all the processes executing on a first network node. The failover operating method comprises executing a process on the first network node, and executing a first monitor on a second network node. The second network node is connected to the first network node via communications links. The method further provides that the first monitor periodically checks the operation of the process. If the first monitor detects an execution failure of the process, then the method provides for the termination of the process executing on the first network node, and transferring and initiating execution of the process on the second network node. The method further provides for initiating execution of a second monitor for the process on the first network node; and terminating execution of the first monitor after the second monitor is operational.

A fourth aspect of the invention provides a computer system adapted to controlling failover so that the termination of all the executing processes is not required. The computer system comprises a first network node and a second network node, along with a memory comprising software instructions adapted to enable the computer system to perform various tasks. The software instructions provide for executing a process on the first network node, and executing a first monitor on the second network node, wherein the second network node connected to the first network node via communications links. The software instructions further provide for periodically checking the operation of the process by the first monitor. If the first monitor detects an execution failure of the process, then the software instructions are adapted to terminate execution of the process on the first network node, and transfer and initiate execution of the process on the second network node. The software instructions are further adapted to initiate execution of a second monitor for the process on the first network node, and terminate the first monitor after the second monitor is operational.

A fifth aspect of the present invention provides a computer software product for a computer system comprising a first network node and a second network node to control failover so that the termination of all the processes executing on the first network node is not required. The computer program product comprises software instructions for enabling the computer system to perform predetermined operations, and a computer readable medium bearing the software instructions. The predetermined operations execute a process on the first network node, and execute a first monitor on the second network node, wherein the second network node connected to the first network node via communications links. The predetermined operations periodically check the operation of the process by the first monitor. If the first monitor detects an execution failure of the process, then the predetermined operations terminate execution of the process on the first network node, and transfer and initiate execution of the process on the second network node. Finally, the predetermined operations initiate execution of a second monitor for the process on the first network node, and terminate the first monitor after the second monitor is operational.

A sixth aspect of the invention provides a method for monitoring and performing a failover of a network node connected to a communication link. The method comprises using at least two managers to monitor the operation of the network node. The two managers exchange heartbeats between themselves via the communications link. If the first manager does not receive a heartbeat from the second manager, then the first manager executes diagnostic tests to determine how to correct the failed receipt of the heartbeat from the second manager. The diagnostic tests include attempting to access the operating system of the second manager, attempting to access a first network interface device of the network node on which the second manager is executing, and attempting to access a first network switch connected to the network node on which the second manager is executing. The method further comprises substituting in redundant network interface devices or redundant network switches if they are found to be faulty.

A seventh aspect of the present invention provides a computer system adapted to controlling failover so that the termination of all the processes executing on a network node is not required. The computer system comprises a plurality of network nodes interconnected by communication links, and a memory comprising software instructions adapted to enable the computer system to perform certain tasks. The software instructions are adapted to use at least two managers to monitor the operation of the network node. The software instructions are further adapted such that the two managers exchange heartbeats between themselves via the communications link. If the first manager does not receive a heartbeat from the second manager, then the software instructions cause the first manager to execute diagnostic tests to determine how to correct the failed receipt of the heartbeat from the second manager. The diagnostic tests in the adapted software instructions include attempting to access the operating system of the second manager, attempting to access a first network interface device of the network node on which the second manager is executing, and attempting to access a first network switch connected to the network node on which the second manager is executing. The software instructions are further adapted to substitute in redundant network interface devices or redundant network switches if software instructions find the network interface devices or network switches to be faulty.

An eighth aspect of the present invention provides for a computer software product for monitoring and performing a failover of a network node connected to a communication link. The computer program product comprises software instructions for enabling the network node to perform predetermined operations, and a computer readable medium bearing the software instructions. The predetermined operations use at least two managers to monitor the operation of the network node. The predetermined operations cause the two managers exchange heartbeats between themselves via the communications link. If the first manager does not receive a heartbeat from the second manager, then the predetermined operations cause the first manager to execute diagnostic tests to determine how to correct the failed receipt of the heartbeat from the second manager. The diagnostic tests commanded by the predetermined operations include attempting to access the operating system of the second manager, attempting to access a first network interface device of the network node on which the second manager is executing, and attempting to access a first network switch connected to the network node on which the second manager is executing. The predetermined operations substitute in redundant network interface devices or redundant network switches if the network interface devices or network switches to be faulty.

The above aspects and advantages of the present invention will become apparent from the following detailed description and with reference to the accompanying drawing figures.

BRIEF DESCRIPTION OF THE DRAWINGS

The accompanying drawings, which are incorporated in and constitute a part of this specification, illustrate the present invention and, together with the written description, serve to explain the aspects, advantages and principles of the present invention. In the drawings.

DETAILED DESCRIPTION OF THE PRESENT INVENTION

Figure 1:
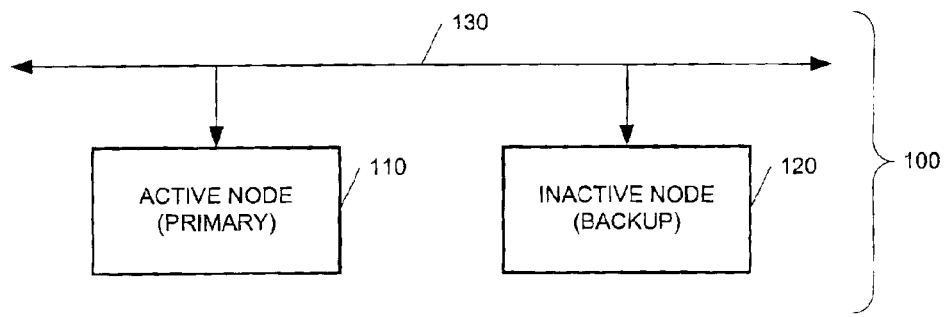
FIG. 1 illustrates a conventional failover system configuration.

Prior to describing the aspects of the present invention, some details concerning the prior art will be provided to facilitate the reader's understanding of the present invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

As used herein, the term "embedded computer" includes, but is not limited to, an embedded central processor and memory bearing object code instructions. Examples of embedded computers include, but are not limited to, personal digital assistants, cellular phones and digital cameras. In general, any device or appliance that uses a central processor, no matter how primitive, to control its functions can be labeled has having an embedded computer. The embedded central processor will execute one or more of the object code instructions that are stored on the memory. The embedded computer can include cache memory, input/output devices and other peripherals.

As used herein, the terms "predetermined operations," the term "computer system software" and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, the terms "media," "medium" or "computer-readable media" include, but is not limited to, a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and all equivalent ways in which instructions for performing predetermined operations are associated with a computer usable medium.

Therefore, for the sake of simplicity, the term "program product" is hereafter used to refer to a computer-readable medium, as defined above, which bears instructions for performing predetermined operations in any form.

As used herein, the term "network switch" includes, but is not limited to, hubs, routers, ATM switches, multiplexers, communications hubs, bridge routers, repeater hubs, ATM routers, ISDN switches, workgroup switches, Ethernet switches, ATM/fast Ethernet switches and CDDI/FDDI concentrators, Fiber Channel switches and hubs, InfiniBand Switches and Routers.

A detailed description of the aspects of the present invention will now be given referring to the accompanying drawings.

At its most basic level, the present invention provides a computer system adapted to controlling failover such that the termination of all the executing processes on the node with the failed process is not required. In general, the computer system comprises a first network node and a second network node, and a memory that comprises software instructions adapted to enable the computer system to execute certain tasks. First of all, the computer system has to initiate and execute a task on the first network node. This task could be one or more of a myriad of processes available for execution. Second, the computer system initiates and executes a first monitor process on the second network node, which is connected to the first network node through a communications link. The first monitor process periodically checks the operation of a corresponding process on the first network node. If the first monitor process detects an execution failure of the corresponding process on the first network node, then the execution of the process is terminated on the first network node. The computer system then transfers the process to the second network node and initiates execution of the process at that node. A second monitor process, corresponding to the newly created process on the second network node, is initiated on the first network node, and the first monitor process is terminated.

Figure 2:
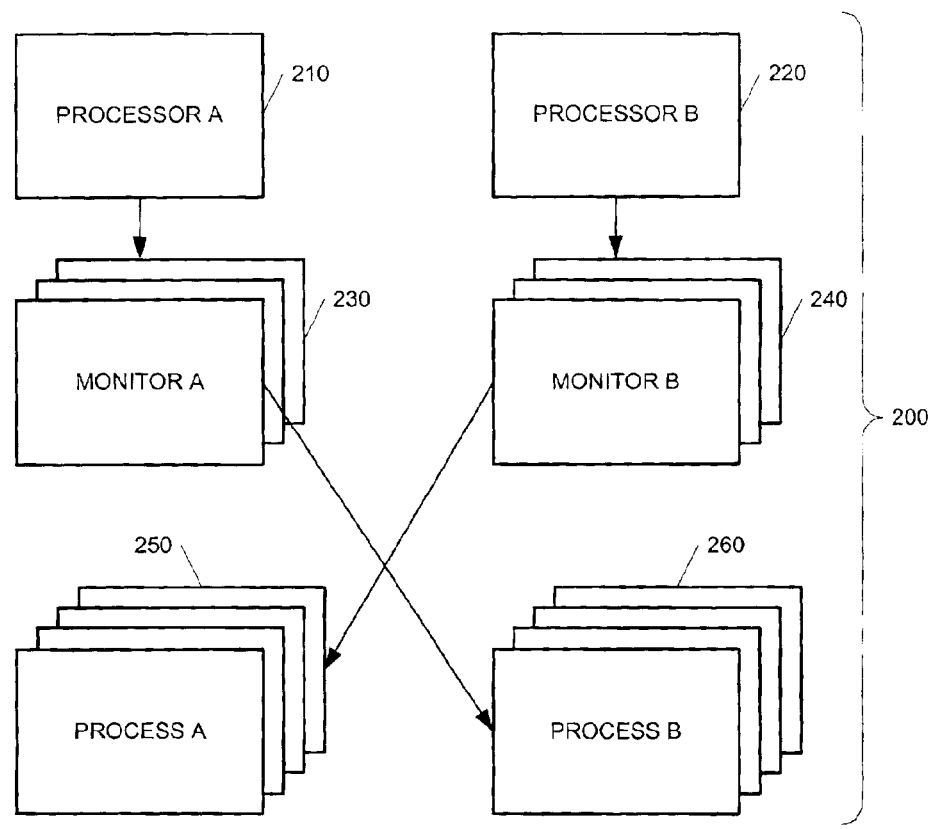
FIG. 2 is an exemplary software implementation of a failover system according to the present invention.

Referring to FIG. 2, an exemplary implementation of failover system 200 is shown. Central processor unit (CPU)

210 performs task 250, and central process unit (CPU) 220 performs task 260, respectively. A process is a self-contained list of software instructions capable of executing as a unit on a CPU. For example, a process can be a service provided by a thread and other units of instruction executing on a CPU. A task is one or more processes performed within a computer program. The system also contains two monitors 230 and 240 executed on processors 210 and 220 respectively. Monitor 230 corresponds to tasks 260 and monitor 240 corresponds to tasks 250. A monitor is a self-contained list of software instructions capable of executing as a unit on a CPU and further capable of monitoring another task executing on a CPU. These monitors periodically send a string or a key to tasks 250 and 260, and wait for a response. In absence of a response, a task will be treated as not operative. Whenever a task is detected to be not operative, the task is terminated from execution on its original CPU and initiated on the other CPU, as well as initiating a monitor for that transferred task now to be executed by the original CPU. This is done without disrupting or otherwise terminating the other processes and their respective monitors executing on their respective CPUs.

The following example explains this method. A process "A" executes on a first CPU 210. A monitor "$m_A$" is dispatched on second CPU 220 for the purpose of monitoring the execution of process "A." If the monitor "$m_A$" is unable to receive a signal from process "A" executing on the first CPU 210, the monitor "$m_A$" signals the first CPU 210 to terminate the execution of process "A" on the first CPU 210, and initiates the execution of process "A" on the second CPU 220. A new monitor "$m_A$" is created on the first CPU 210 to monitor the now initiated process "A," now executing on the second CPU 220. The first CPU 210 is not declared as a failure point, but rather only the execution of process "A" on the first CPU 210 is affected.

It is also possible to determine the desired granularity of monitoring sub-processes, such as threads, to achieve a more accurate control over various components within a process executed at any given time by any one of the processors involved. By providing monitors at any desired level of operation, as well as the ability to switch from one operative resource (e.g., switching from one CPU to another CPU), the system is capable of providing failover capabilities without terminating all the processes running on one resource if a failure is detected. A system could be implemented where the monitors "m" execute on a separate system, or systems capable of communicating with the resources they respectively monitor. The number of CPUs 210 capable of executing processes and performing the monitor and switching functions shown above can be easily increased.

Figure 3A:
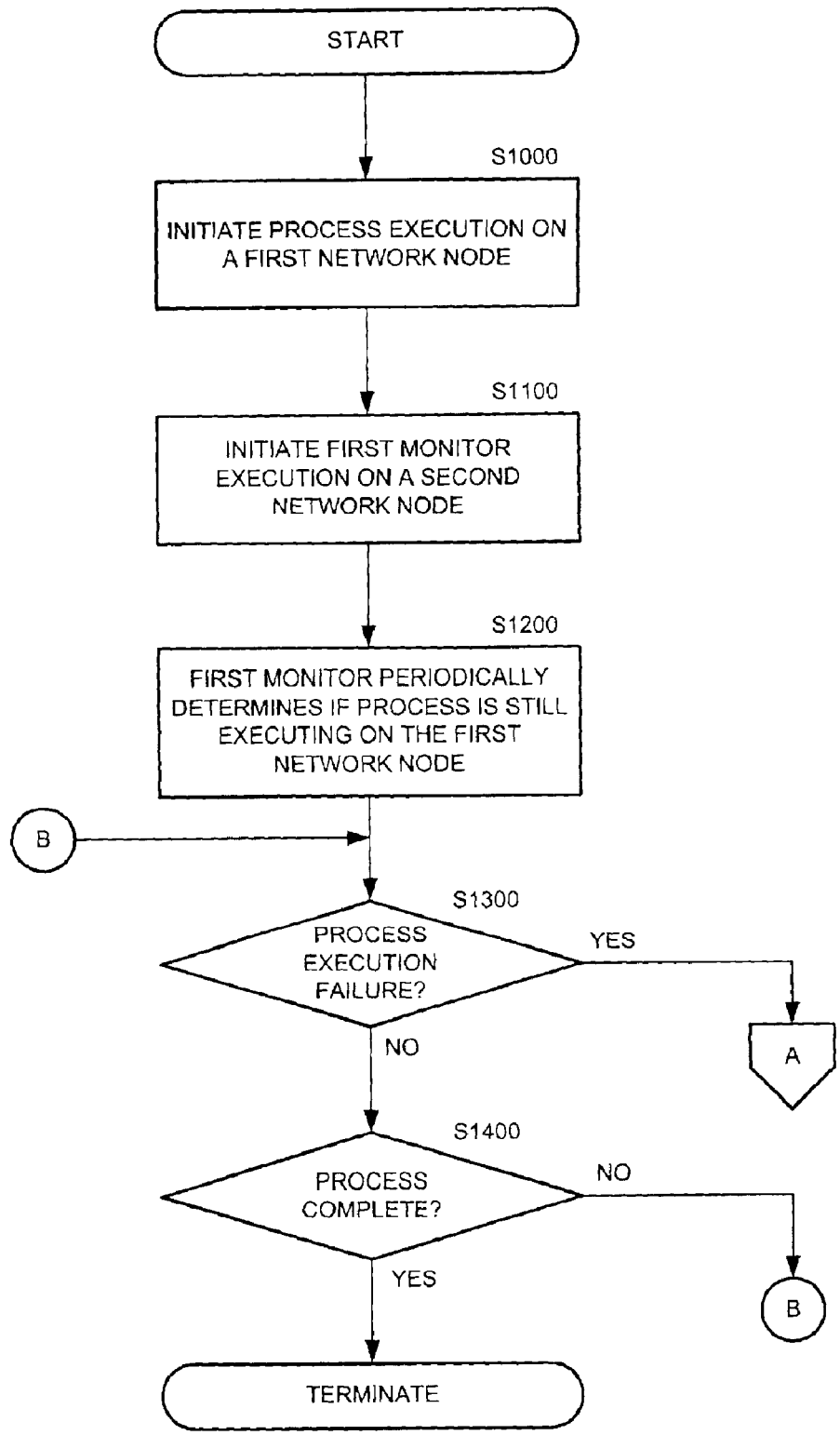
FIGS. 3A–3B illustrate an exemplary process flow of an aspect of the present invention.

Referring to FIG. 3A, an aspect of the present invention is illustrated. At S1000, process execution is initiated on a first network node. As described above, this process can be any sort of application that the network node is capable of executing. At S1100, a first monitor process is initiated on a second network node. At S1200, the first monitor process periodically determines if the process is still executing on the first network node. As described above, the first monitor process can accomplish this by sending a key or a character string to the process, and receiving the appropriate return message. At S1300, the first monitor process determines if there is a process execution failure. If the process has failed to execute, then the process flow proceeds to S1310. Otherwise, at S1400, a determination is made if the process has completed its task. If the process has not yet completed its task, then the process flow returns to S1200. Otherwise, the process terminates.

Figure 3B:
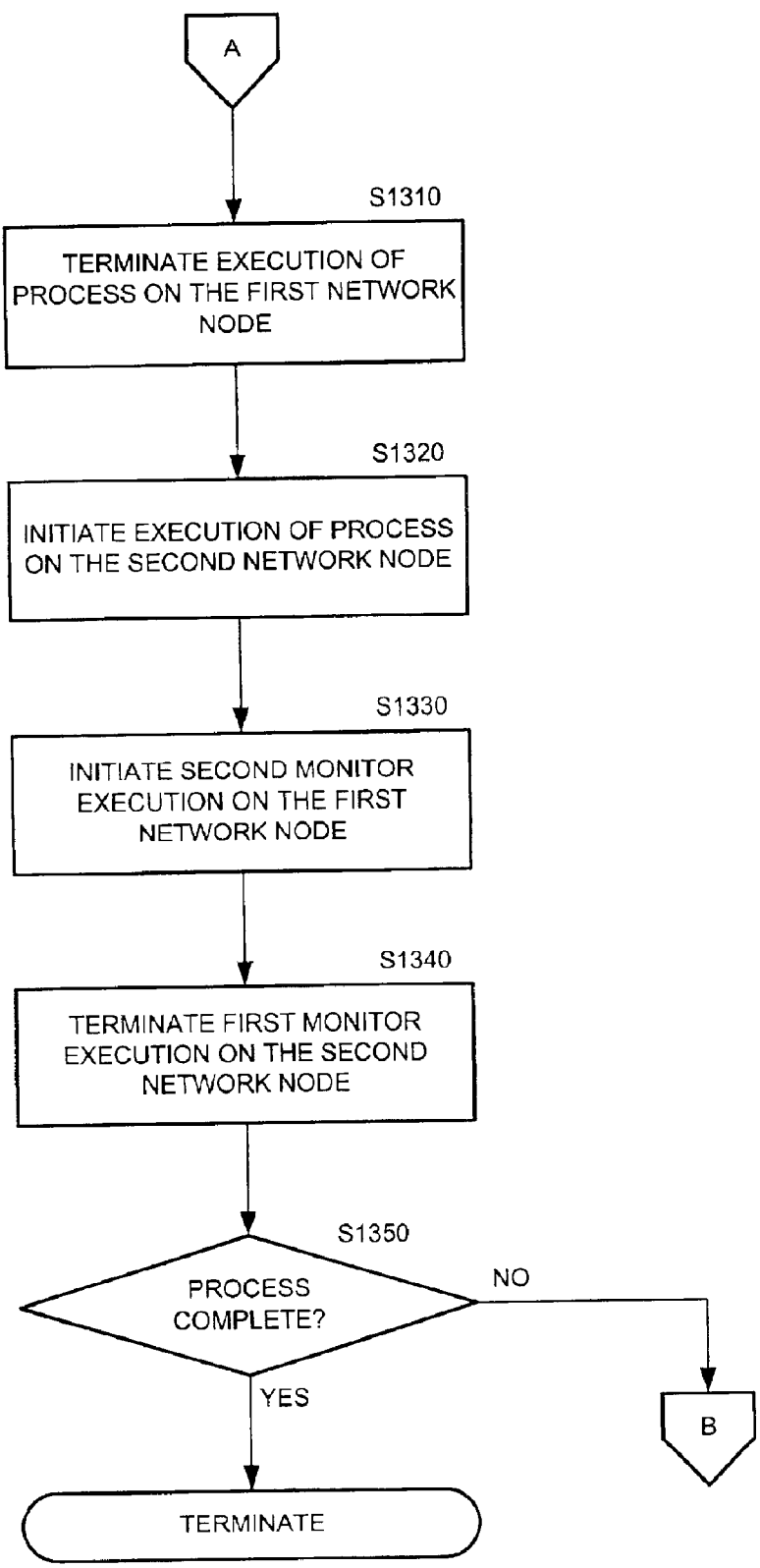

Referring to FIG. 3B, at S1310, the execution of the process on the first network node is terminated. The monitor process, at S1320, then transfers the process to the second network node, and initiates execution of the process on the second network node. At S1330, a second monitor process is initiated on the first network node, and, at SI 340, the first monitor process is terminated on the second network node. Finally, at S1350, a determination is made if the process has completed its task. If the process has not yet completed its task, then the process flow continues at step S1200. Otherwise, the process terminates.

Another aspect of the invention provides a computer software product for a computer system that comprises a first network node and a second network node. The computer software product controls failover so that the termination of all the processes executing on the first network node is not required. The computer program product comprises software instructions that enable the computer system to perform predetermined operations, and a computer readable medium bearing the software instructions. The predetermined operations comprise initiating and executing a process on the first network node, and initiating and executing a first monitor process on the second network node. The second network node is connected to the first network node via a communications link. The predetermined operations further comprise the first monitor process periodically checking the operation of the process executing on the first network node. If the first monitor process detects an execution failure of the process, then the predetermined operations terminate execution of the process on the first network node, and transfer and initiate execution of the process on the second network node. The predetermined operations further comprise the initiation of execution of a second monitor for said process on the first network node. Finally, the predetermined operations on the computer-readable medium comprise terminating the first monitor after the second monitor begins execution.

Figure 4:
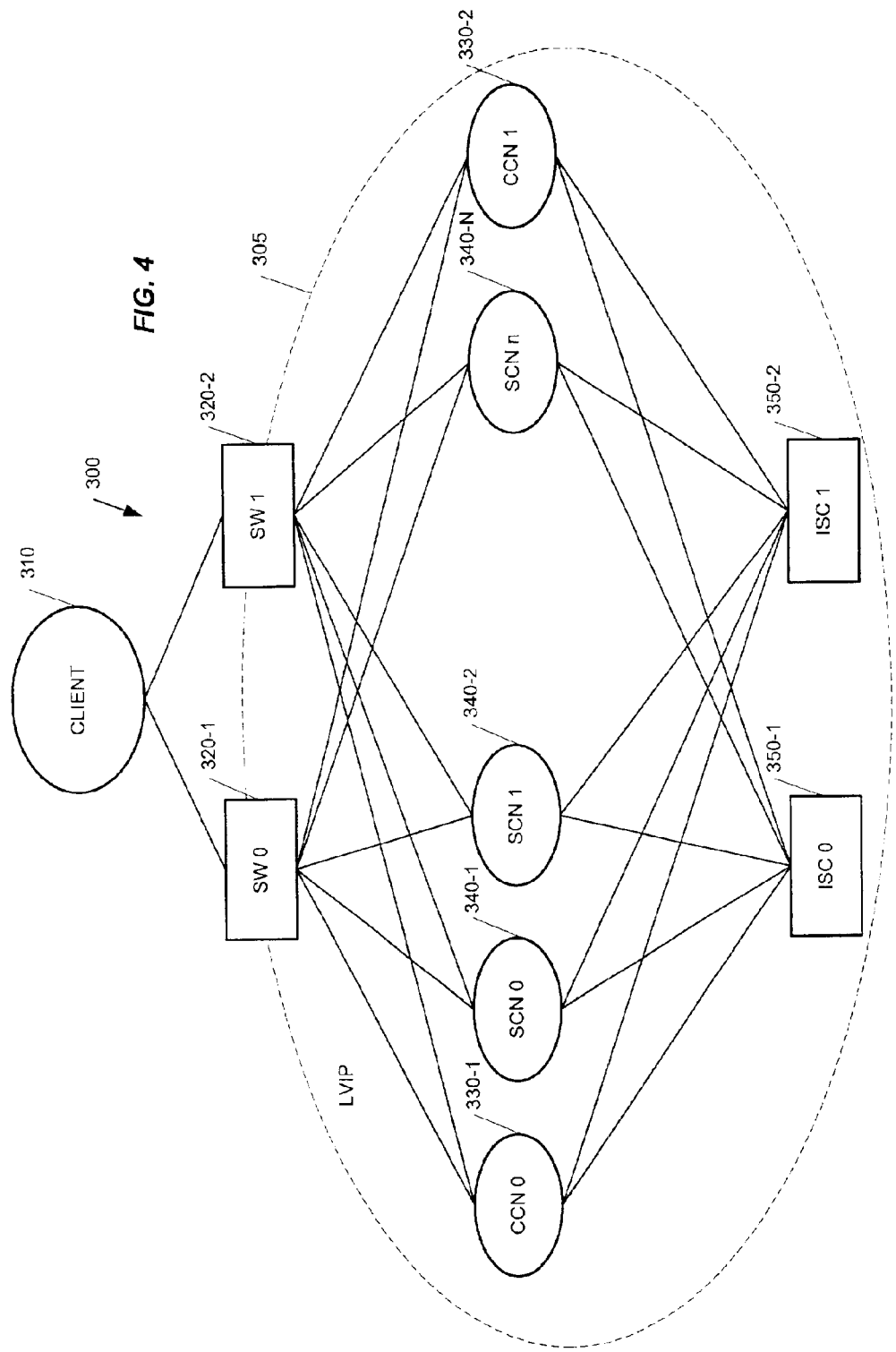
FIG. 4 is an exemplary hardware implementation of a failover system according to the present invention.

Referring to FIG. 4, a subnet cluster 305 is illustrated as part of a system 300 capable of communicating with a client in at least two paths. A detailed description of the architecture is included in PCT application number PCT/IUS00/34258, entitled "Interconnect Topology For A Scalable Distributed Computer System," which is assigned to the same common assignee as the present application, and is hereby incorporated herein by reference in its entirety for all it discloses. A detailed description is included in "Apparatus And Method For Load Balancing In Systems Having Redundancy," U.S. Application Serial No. _____, which is assigned to the same common assignee as the present application, and is hereby incorporated herein by reference in its entirety for all it discloses. The implementation of system 300 replaces a single virtual Internet protocol (VIP) address with a finer granularity of global VIP (GVIP) and local VIP (LVIP). The GVIP is a single address assigned to all clients that are connected behind a router. The LVIP is a specific address assigned to each subnet connected through a switch to the cluster. Typically, the number of LVIPs equals the number of subnets connected to the cluster not through a router.

Referring to FIG. 4 where a subnet cluster 305 is shown as part of a system 300 capable of communicating with a client in at least two paths. External to cluster 305, a single GVIP may be used, while inside the cluster multiple LVIPs are used. In such a cluster 305, there may be at least two network switches (SW) 320-1 and 320-2 allowing for at least two communication paths to a client 310. Each network switch 320 is connected to multiple storage control nodes (SCN) 340-1, 340-2, 340-n (where n is the number of storage control nodes) and to at least two cache control nodes (CCN) 330-1 and 330-2. At least two interconnect switches (ICS) 350-1 and 350-2 are connected to the storage control nodes 340 and the cache control nodes 330 to allow for redundant means of communication between the different elements.

In accordance with an aspect of this invention, when a failure occurs in a redundant element of the system, the redundant element is not automatically transferred to an inactive mode. Instead, the process attempted to be performed on the redundant unit is transferred to another similar resource. For example, if a process is executed on a first CCN 330-1 and a monitor does not get the desired response, the process can be terminated on the first CCN 330-1 and initiated on the second CCN 330-2 without shutting down active processes executing successfully on the first CCN 330-1. A system can be implemented where the monitors execute on a separate resource capable of communicating with the resource being monitored. The number of resources capable of executing processes and performing the monitor and switching functions shown can be increased beyond the number shown in FIG. 4.

Figure 5:
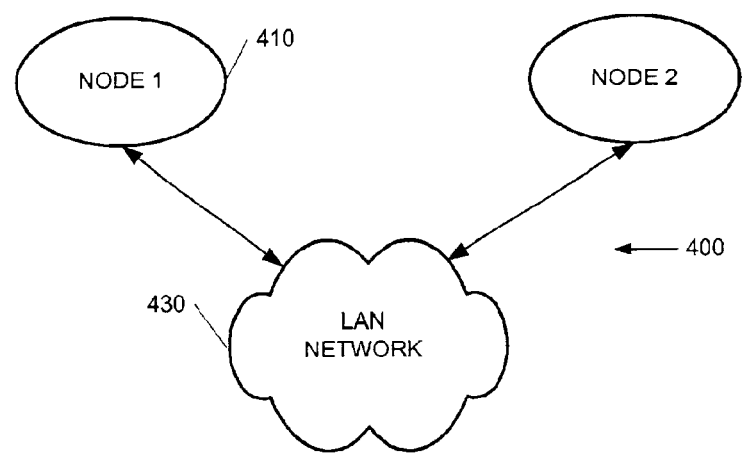
FIG. 5 is an exemplary implementation of a failover system over a LAN network according to the present invention.

Referring to FIG. 5, a LAN network failover system 400 is shown, where a first node 410 and a second node 420 are connected via a local area network (LAN) connection 430. A node can be a host, a server, a storage device, a file system, a location independent file system, a computer within the network, or other resources connected to the network capable of accepting processes from another similar unit. Each node is capable of monitoring the services provided by other nodes.

In the case where a monitor is on the first node 410, and while monitoring a service on the second node 420, if the first node 410 does not receive a response from that service, the first node 410 initiates the termination of the service on the second node 420. The first node 410 initiates local execution of the service that it previously monitored, as well as initiating a monitor of the service on the second node 420. Therefore, after that operation, the service is now provided on first node 410 and monitored by the second node 420. By providing such monitors at any desired level of operation, as well as the ability to switch from one node to another, the system is capable of providing failover capabilities without terminating all the processes running on one node if a failure is detected.

A system can be implemented where the monitors execute on a separate node, or nodes capable of communicating, over LAN 430 with the nodes they monitor, respectively. The number of nodes capable of executing processes and performing the monitor and switching functions shown above can be easily increased. A person skilled in the art could easily replace LAN 430 with other network solutions including, but not limited to, a synchronous transfer mode (ATM) network, Infiniband, and others. A person skilled in the art could further increase the number of nodes as may be desired and having at least each pair providing the failover capabilities described above.

Figure 6:
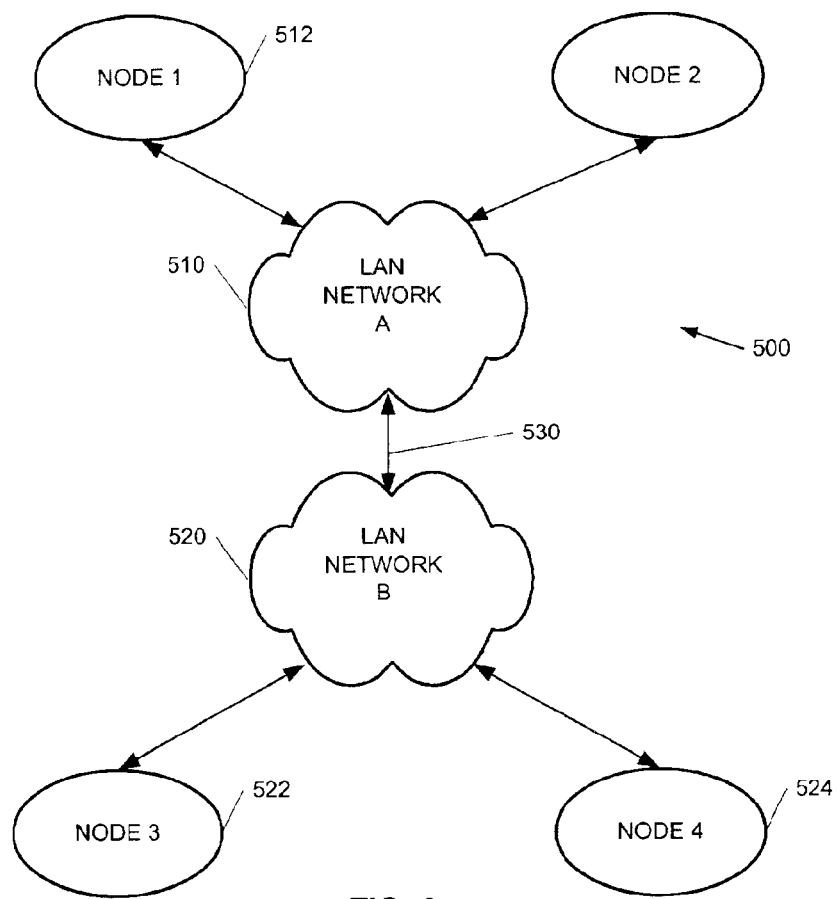
FIG. 6 is an exemplary implementation of a failover system over a WAN network according to the present invention.

Referring to FIG. 6, a wide area network (WAN) failover system 500 is shown where two LAN based networks 510 and 520 are connected via a WAN connection 530. Each LAN network contains two nodes, such that two nodes 512 and 514 are connected to a first LAN network 510, and nodes 522 and 524 are connected to a second LAN network 520. If one of the services supplied by one node 512 becomes unresponsive, another node 524 could start providing this service on behalf of node 512. Hence, in addition to the capability of replacing each other within a LAN, nodes from different LAN networks could replace each other when failover is to take place. A system could be implemented where the monitors execute on a separate node or nodes capable of communicating over the LAN 510 and 520, as well as the WAN 530, with the nodes they respectively monitor. A person skilled in the art could further increase the number of nodes as may be desired and having at least each pair providing the failover capabilities described above.

Another aspect of the present invention provides a computer system that is adapted to controlling failover so that the termination of all the processes executing on a network node is not required. Typically, the computer system comprises a plurality of network nodes interconnected by communication links and a memory that comprises software instructions adapted to enable the computer system to perform several tasks. The software instructions are adapted to monitor the operation of a node in the plurality of network nodes by using at least two monitor managers. The software instructions are further adapted such that the two monitor managers exchange heartbeats between themselves. If the first manager does not receive a heartbeat from the second manager, then the software instructions cause the first manager to execute diagnostic tests to determine how to correct the failed receipt of the heartbeat from the second manager.

The diagnostic tests of the computer system comprise a series of hardware and software tests. The software instructions are adapted to command the first monitor manager to attempt to access the second monitor manager, to attempt to access the operating system of the network node where the second monitor manager is executing, to attempt to access a first network interface device the network node where the second monitor manager is executing, and to attempt to access a first switch of the network node where the second monitor manager is executing. The software instructions for the computer system are further adapted so that the first monitor manager uses redundant network interface devices and/or redundant network switches to attempt to access the operating system of the network node where the second monitor manager process is operating.

Figure 7:
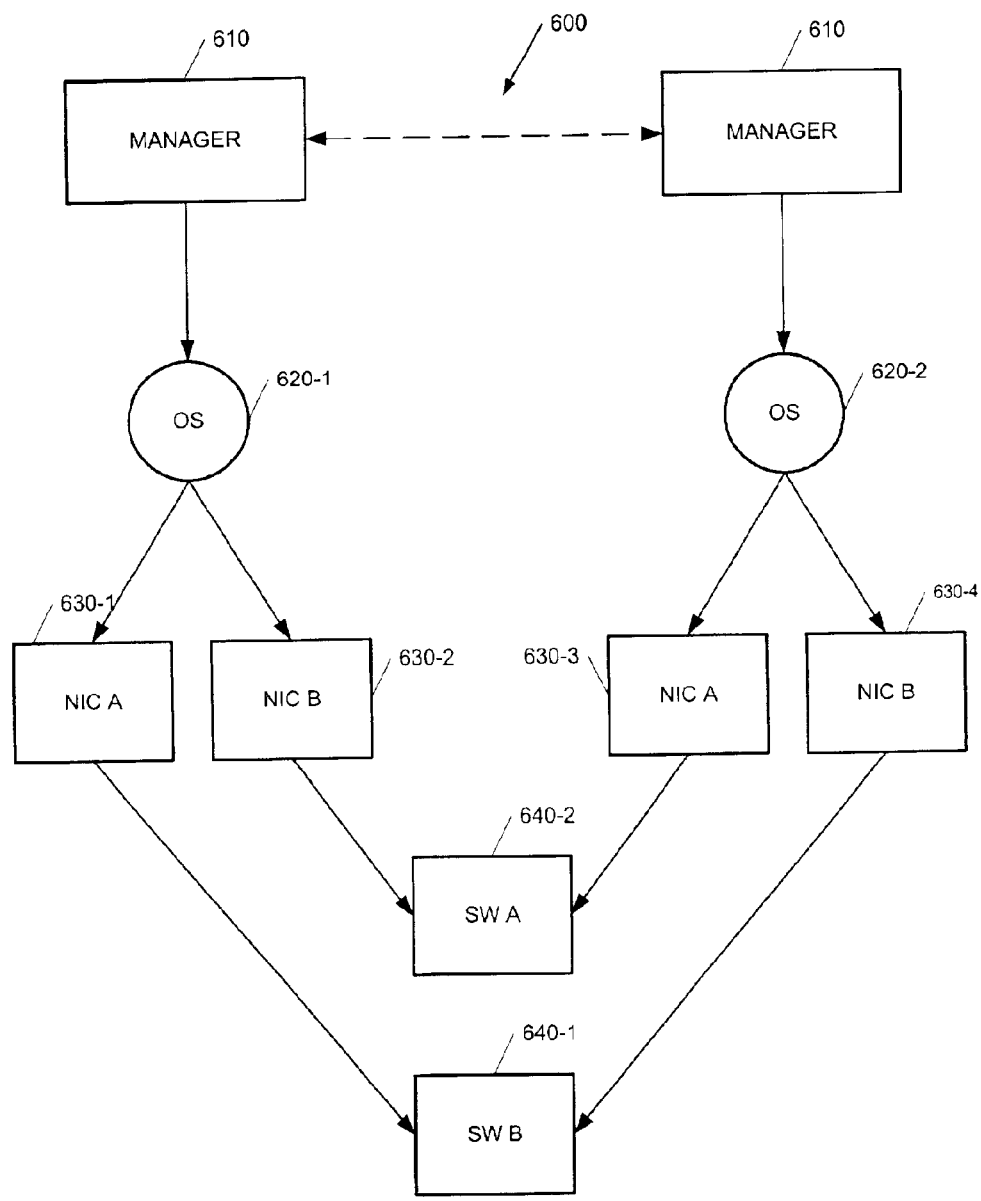
FIG. 7 is an exemplary failover system for a failover of system nodes according to the present invention.

Referring to FIG. 7, an implementation of a node monitoring system 600 is shown. The node monitoring system 600 comprises a pair of managers 610-1 and 610-2 monitoring a plurality of network nodes (not shown). A manager 610 could be a daemon, a server, any computer within the network, or a system capable of the monitoring function defined herein below. A node could be a host, a server, a storage device, a file system, a location independent file system, computer within a network, or a resource connected to the network. The managers 610-1 and 610-2 exchange "heartbeats" to indicate that their respective monitored nodes are operational, i.e., when a manager 610-1 receives a "heartbeat" signal from a manager 610-2 of another node, it assumes that such manager 610 is operating on an operational node. A failure to receive a "heartbeat" signal from an operational node will cause a manager 610-1 residing on a different node to suspect that the operational node is a suspect for failure. The manager 610 will begin a series of tests to determine the node health.

For example, a "heartbeat" is implemented by sending a signal at predefined time periods to signal that a node is active, or otherwise alive. As a practical matter, the heartbeat signal does not move directly between managers 610-1 and 610-2. Instead, the heartbeat signal is directed through operating system (OS) 620-1 to network interface card (NIC) 630-1, and then to switch (SW) 640-1.

The heartbeat signal is directed to another NIC 630-4 and OS 620-2 eventually reaching manager 610-2 on the other node. Failure to receive a heartbeat signal or a number of heartbeat signals from a manger 610-1 will cause the monitoring manager 610-2 to suspect that the other manager 610-1 of a node is at least partially inoperative. To validate the degree of inoperability, several other checks can be attempted. For example, it is possible that there is a problem in manager 610-1 itself. Therefore, the corresponding manager 610-2 initiates a test to OS 620-1 of the other manager 610-1 to validate if OS 620-1 of that manager 610-1 is still operative. Hence, if OS 620-1 is operative, then the problem is likely in manager 610-1, but not in the node itself. If manager 610-2 is unable to contact the respective OS 620-1, the manager 610-2 may attempt to do same by using a different NIC 630-3, i.e., using NIC B instead of NIC A. It may further attempt to use an alternate SW 640-2, i.e., SW B instead of SW A.

Depending on the failure analysis, the system can identify where the problem is, and how it should reconfigure the system for future operation. The exemplary system described can use multiple nodes and multiply redundant paths. In addition, NIC A 630-1 to SW B 640-2 and vice-versa to achieve higher levels of redundancy.

Figure 8:
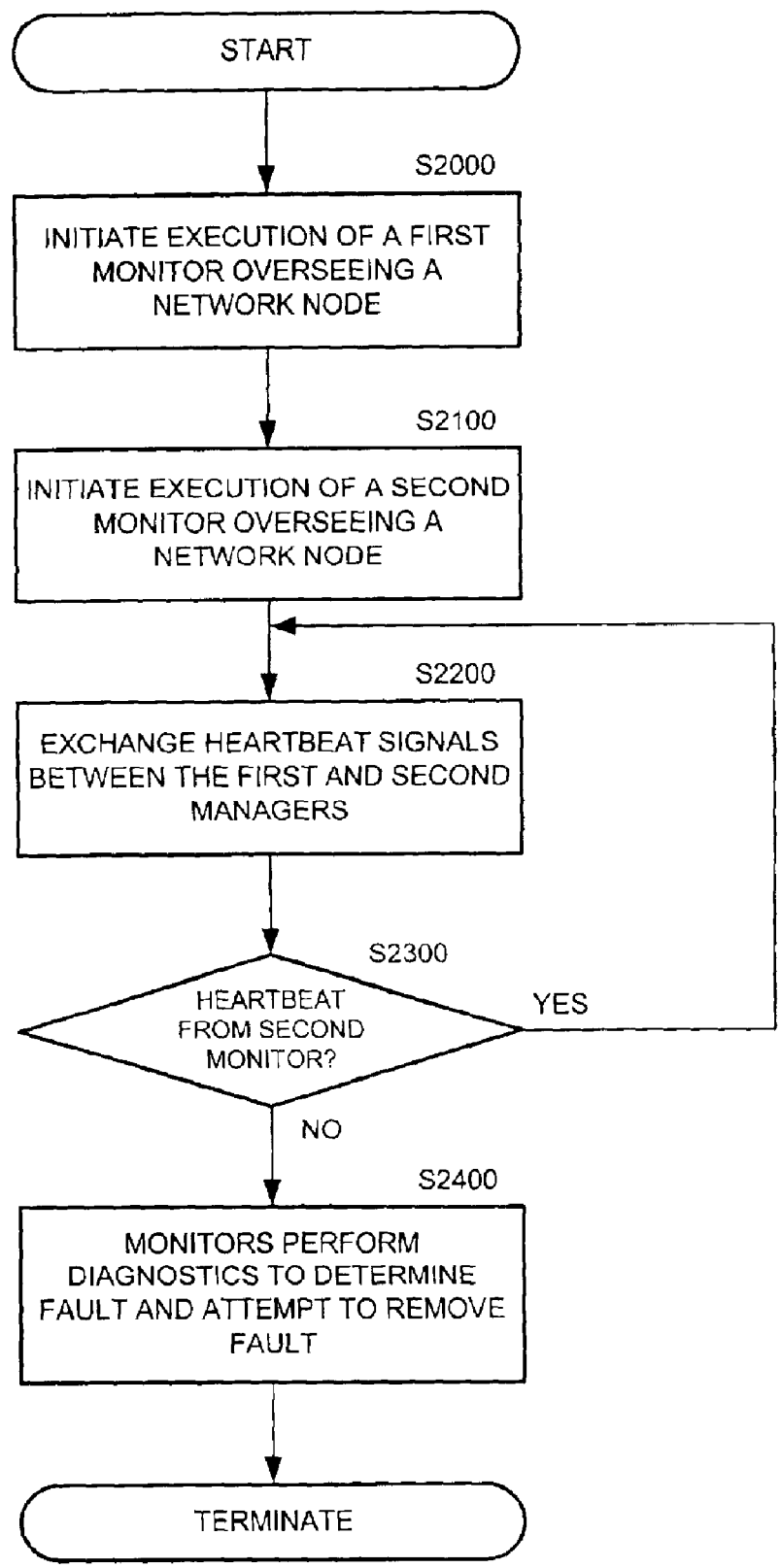
FIG. 8 illustrates an exemplary process flow of another aspect of the present invention.

Referring to FIG. 8, an exemplary process flow of this aspect of the invention is illustrated. At S2000, the execution by a first manager of a first monitor process overseeing the operation of a network node is initiated. At S2100, the execution by a second manager of a second monitor process overseeing the operation of the same network node is initiated. At S2200, the first monitor process and the second monitor process exchange heartbeat signals at a predetermined interval rate. At S2300, the first monitor process determines whether or not it received a heartbeat signal from the second monitor process (as described above). If the first monitor has received a heartbeat signal from the second monitor process, then the process flow returns to S2200. If the first monitor process has not received a heartbeat signal, then, at S2400, the first manager initiates diagnostic testing in order to determine the fault with the second monitor process of second manager and to remove the fault, if possible.

Figure 9A:
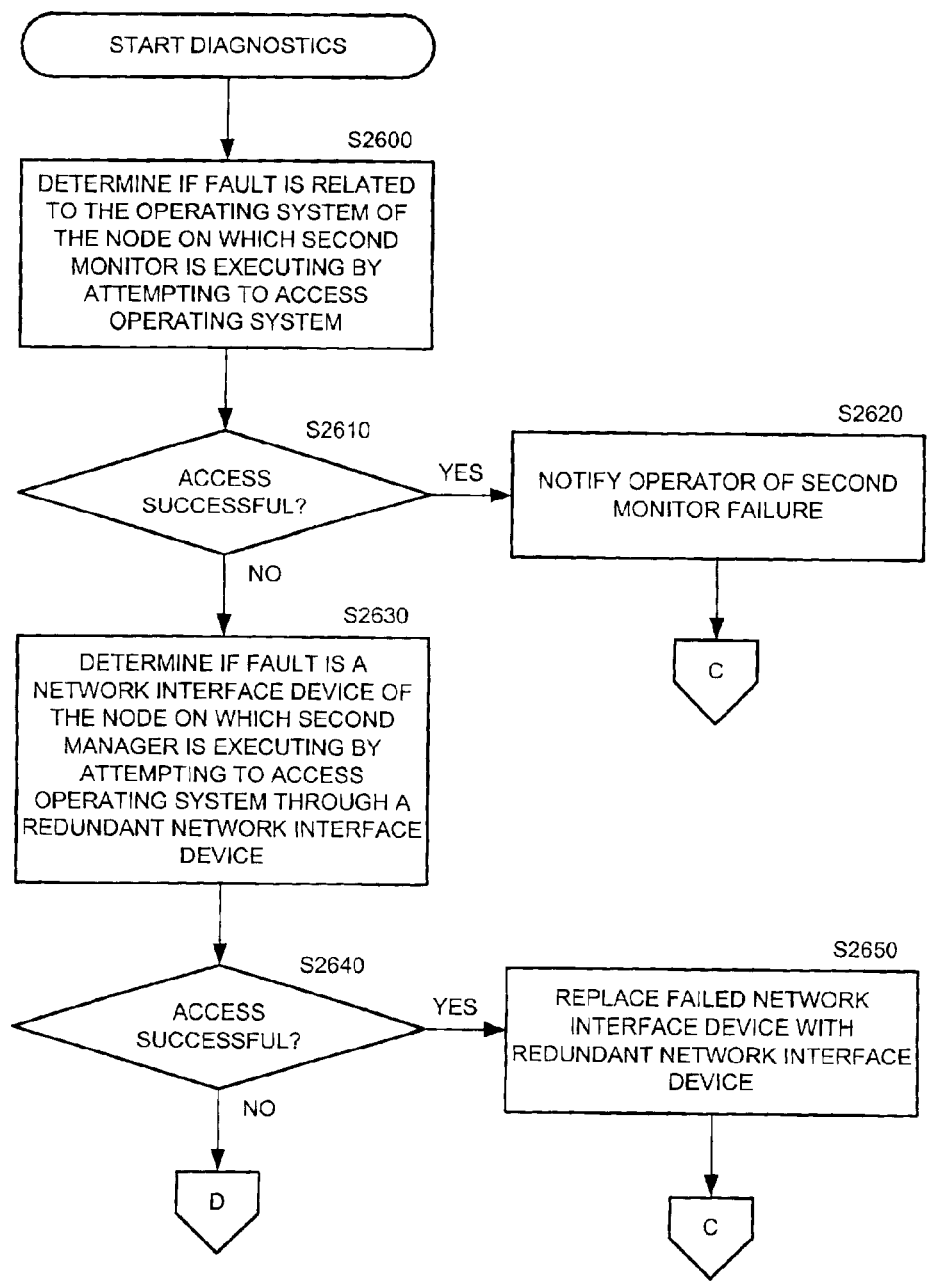
FIGS. 9A–9B illustrate an exemplary diagnostic process flow according to an aspect of the present invention.
Figure 9B:
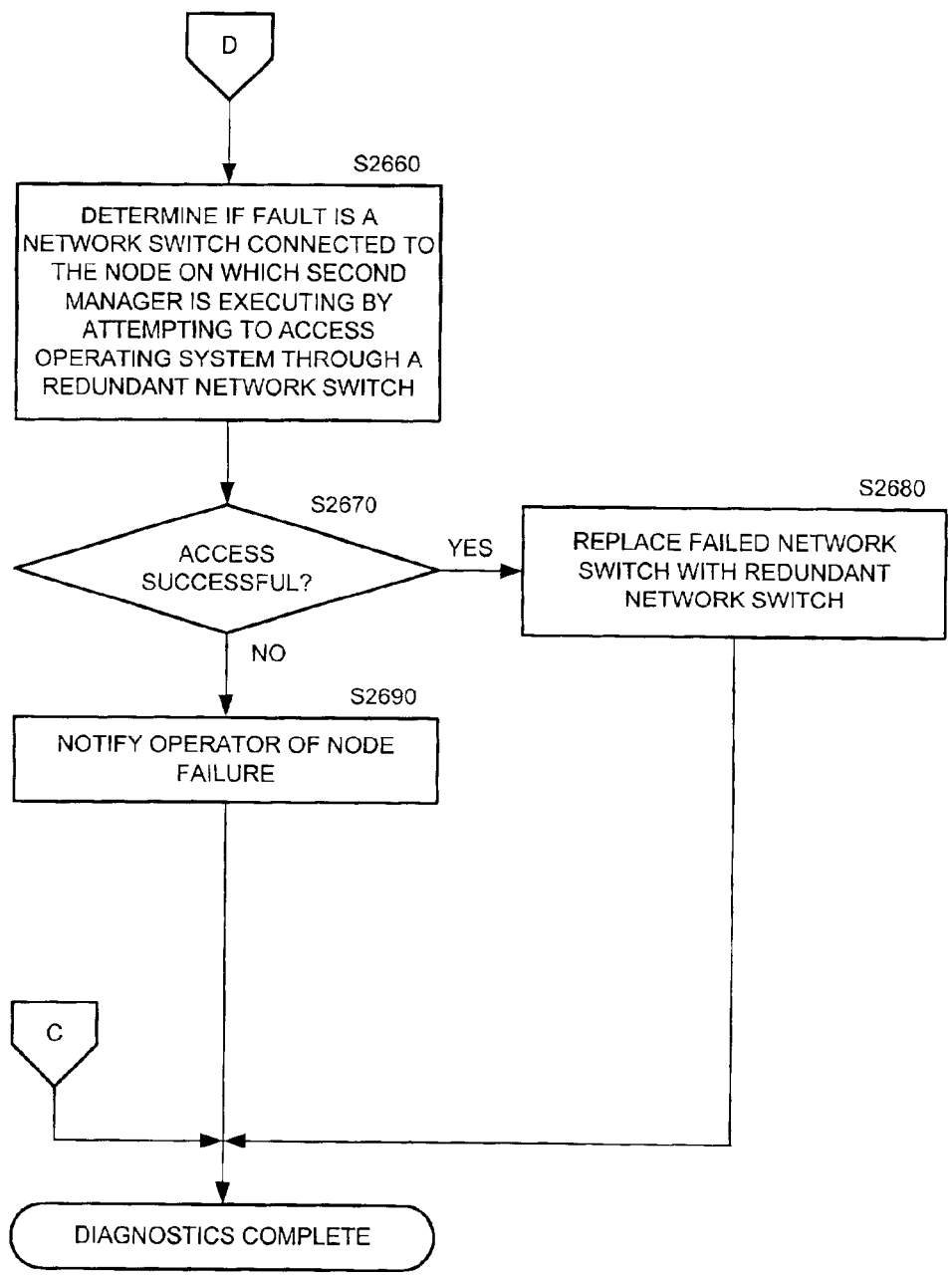

Referring to FIGS. 9A–9B, an exemplary diagnostic flow according to the present invention is illustrated. At S2600, the first monitor process attempts to access the operating system of the node where the second manager process is executing in order to determine if the operating system has somehow failed. At S2610, a determination is made if the operating system can be accessed. If the operating system of the second network node can be accessed, then, at S2620, the operator is notified of a monitor failure. Possible remedies include starting another monitor process at the same node or a different node. If the attempt to access the operating system of the second network node is unsuccessful, then, at S2630, a determination is made if the operating system of the second network node can be accessed through a redundant network interface device. At S2640, if the operating system can be accessed, then, at S2650, the redundant network interface replaces the failed network interface device.

If the attempt to access the operating system of the second network node is unsuccessful, then, at S2660, a determination is made if the operating system of the second network node can be accessed through a redundant network switch. At S2670, if the operating system can be accessed, then, at S2680, the redundant network interface replaces the failed network interface device. Otherwise, the system operator is notified, at S2690, of the possibility of a failed network node.

Another aspect of the present invention provides a computer software product for monitoring and performing a failover of a network node connected to a communication link. The computer program product embodies the software instructions for enabling the network node to perform predetermined operations, and a computer readable medium bearing the software instructions. As described above, the predetermined operations comprise using two monitor managers that monitoring the operation of a node in the plurality of network nodes. The predetermined operations further comprise exchanging heartbeats between the two managers via the communications link. If the first manager does not receive a heartbeat from the second manager, then the predetermined operations cause the first manager to execute diagnostic tests to determine how to correct the failed receipt of the heartbeat from the second manager.

The foregoing description of the aspects of the present invention has been presented for purposes of illustration and description. It is not intended to be exhaustive or to limit the present invention to the precise form disclosed, and modifications and variations are possible in light of the above teachings or may be acquired from practice of the present invention. The principles of the present invention and its practical application were described in order to explain the to enable one skilled in the art to utilize the present invention in various embodiments and with various modifications as are suited to the particular use contemplated.

Thus, while only certain aspects of the present invention have been specifically described herein, it will be apparent that numerous modifications may be made thereto without departing from the spirit and scope of the present invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A system comprising:
   a first network node and a second network node connected via a communication link;
   a plurality of processes resident on said first network node and presently executing;
   a plurality of monitors for said plurality of processes, each of said plurality of processes having one corresponding monitor from said plurality of monitors, said corresponding monitors resident on said second network node and presently executing,
   each monitor being configured for detecting failure of its corresponding process on said first network node and, if its corresponding process has failed, causing said failed process to execute on said second network node as a new process having a corresponding monitor executing on said first network node, while the remaining processes continue to execute on said first network node.

2. The system of claim 1, wherein said first and second network nodes are central processing units.

3. The system of claim 1, wherein said first and second network nodes are computer hosts.

4. The system of claim 1, wherein said first and second network nodes are computer servers.

5. The system of claim 1, wherein said first and second network nodes are storage nodes.

6. The system of claim 1, wherein said first and second network nodes are printer nodes.

7. The system of claim 1, wherein said first and second network nodes are file systems.

8. The system of claim 1, wherein said first and second network nodes are location independent file systems.

9. The system of claim 1, wherein said communication link is a local area network.

10. The system of claim 1, wherein said communication link is a wide area network.

11. The system of claim 1, wherein said monitors periodically check their corresponding processes executing on said first network node in order to detect a failure.

12. The system of claim 11, wherein said periodic checking comprises sending a key to said corresponding process and receiving a predefined response.

13. The system of claim 11, wherein said periodic checking comprises monitoring heartbeat signals sent at a periodic rate.

14. The system of claim 11, wherein, when one of said corresponding monitors detects a failure, said one corresponding monitor initiates a process swap, said process swap comprising:
- terminating said failed process from executing on said first network node;
- initiating said failed process as a new process executing on said second network node;
- initiating a new corresponding monitor on said first network node that monitors said new process executing on said second network node; and
- terminating said one corresponding monitor executing on said second network node.

15. The system of claim 1, wherein said process is selected from the group consisting of a service, a task and a thread.

16. A system comprising:
- a first plurality of network nodes connected via a first communication link;
- a second plurality of network nodes connected via a second communication link;
- said first communication link and said second communication link connected through a third communication link,
- a plurality of processes resident on one of the network nodes and presently executing;
- a plurality of monitors for said plurality of processes, each of said plurality of processes having one corresponding monitor from said plurality of monitors, said corresponding monitors resident on another one of the network nodes and presently executing,
- each corresponding monitor being configured for detecting failure of its corresponding process and, if its corresponding process has failed, causing said failed process to execute on another of the network nodes as a new process having a corresponding monitor executing on said one network node while the remaining processes continue to execute on said one network node.

17. The system of claim 16, wherein said network nodes are central processing units.

18. The system of claim 16, wherein said network nodes are computer hosts.

19. The system of claim 16, wherein said network nodes are computer servers.

20. The system of claim 16, wherein said network nodes are storage nodes.

21. The system of claim 16, wherein said network nodes are printer nodes.

22. The system of claim 16, wherein said network nodes are file systems.

23. The system of claim 16, wherein said network nodes are location independent file systems.

24. The system of claim 16, wherein said first communication link and said second communication link are local area networks.

25. The system of claim 16, wherein said third communication link is a wide area network.

26. The system of claim 16, wherein said corresponding monitors periodically check their corresponding processes executing on said one node of said first plurality of network nodes in order to detect a failure.

27. The system of claim 26, wherein said periodic checking comprises sending a key to said corresponding process and receiving a predefined response.

28. The system of claim 26, wherein said periodic checking comprises monitoring heartbeat signals sent at a periodic rate.

29. The system of claim 26, wherein, when one of said corresponding monitors detects a failure, said one corresponding monitor initiates a process swap, said process swap comprising:
- terminating said failed process from executing on said one network node;
- transferring and initiating said failed process as a new process executing on another network node;
- initiating a new corresponding monitor on another network node that is not the same node as the node to which the failed process was transferred, wherein said new corresponding monitor monitors said new process; and
- terminating said corresponding monitor executing on said one network node.

30. The system of claim 29, wherein, if said failed process initially executed on a network node connected to said first communication link, then said new process execution is initiated on a network node connected to said second communication link.

31. The system of claim 29, wherein, if said failed process initially executed on a network node connected to said second communication link, then said new process execution is initiated on a network node connected to said first communication link.

32. The system of claim 29, wherein if said one corresponding monitor initially executed on a network node connected to said first communication link, then execution of said new corresponding monitor is initiated on a node connected to said second communication link.

33. The system of claim 29, wherein if said one corresponding monitor initially executed on a network node connected to said second communication link, then execution of said new corresponding monitor is initiated on a network node connected to said first communication link.

34. The system of claim 16, wherein said process is selected from the group consists of a service, a task and a thread.

35. A method for operating a failover system, wherein failover does not require the termination of all the processes executing on a first network node, the method comprising:
- executing a plurality of processes resident on the first network node;
- executing a plurality of monitors for said plurality of processes, each of said plurality of processes having one corresponding monitor from said plurality of monitors resident on a second network node, said second network node connected to said first network node via a communications link;

periodically checking the operation of said plurality of processes, said periodic checking performed by said plurality of corresponding monitors;

if an execution failure of a process of said plurality of processes is detected by its corresponding monitor, then terminating execution of said failed process from executing on said first network node while the remaining processes continue to execute on said first network node;

transferring and initiating execution of said failed process as a new process on said second network node;

initiating execution of a new corresponding monitor for said new process on said first network node; and terminating said corresponding monitor of said failed monitor from executing on said first network node.

36. The method of claim 35, wherein said first and second network nodes are a central processing units.

37. The method of claim 35, wherein said first and second network nodes are computer hosts.

38. The method of claim 35, wherein said first and second network nodes are computer servers.

39. The method of claim 35, wherein said first and second network nodes are storage nodes.

40. The method of claim 35, wherein said first and second network nodes are printer nodes.

41. The method of claim 35, wherein said first and second network nodes are file systems.

42. The method of claim 35, wherein said first and second network nodes are location independent file systems.

43. The method of claim 35, wherein said communication link is a local area network.

44. The method of claim 35, wherein said communication link is a wide area network.

45. The method of claim 35, wherein said process is selected from the group consisting of a service, a task and a thread.

46. A computer system for controlling failover so that the termination of all the executing processes is not required, the computer system comprising:

a first network node and a second network node;

a memory comprising software instructions that enable the computer system to perform:

executing a plurality of processes resident on the first network node;

executing a plurality of monitors for said plurality of processes, each of said plurality of processes having one corresponding monitor from said plurality of monitors resident on a second network node, said second network node connected to said first network node via a communications link;

periodically checking the operation of said plurality of processes, said periodic checking performed by said plurality of corresponding monitors;

if an execution failure of one process of said plurality of processes is detected by its corresponding monitor, then terminating execution of said failed process from executing on said first network node while the remaining processes continue to execute on said first network node;

transferring and initiating execution of said failed process as a new process on said second network node;

initiating execution of a new corresponding monitor for said new process on said first network node; and terminating said corresponding monitor of said failed process from executing on said first network node.

47. A computer software product for a computer system comprising a first network node and a second network node to control failover so that the termination of all the processes executing on said first network node is not required, the computer program product comprising:

software instructions for enabling the computer system to perform predetermined operations, and a computer readable medium bearing the software instructions, said predetermined operations comprising:

executing a plurality of processes resident on the first network node;

executing a plurality of monitors for said plurality of processes, each of said plurality of processes having one corresponding monitor from said plurality of monitors resident on a second network node, said second network node connected to said first network node via a communications link;

periodically checking the operation of said plurality of processes, said periodic checking performed by said plurality of corresponding monitors;

if an execution failure of a process of said plurality of processes is detected its corresponding monitor, then terminating execution of said failed process from executing on said first network node while the remaining processes continue to execute on said first network node;

transferring and initiating execution of said failed process as a new process on said second network node;

initiating execution of a new corresponding monitor for said new process on said first network node; and terminating said corresponding monitor of said failed process from executing on said first network node.

48. A system comprising:

a first network node and a second network node connected via a communication link;

at least one application comprising a plurality of sub-processes resident on said first network node and presently executing;

a plurality of monitors for said plurality of sub-processes, each of said plurality of sub-processes having one corresponding monitor from said plurality of monitors, said plurality of monitors resident on said second network node and presently executing, each corresponding monitor being configured for detecting failure of its corresponding sub-process of said application on said first network node and, if a corresponding sub-process has failed, causing said failed sub-process to execute on said second network node as a new sub-process having a corresponding monitor executing on said first network node while the remaining sub-processes continue to execute on said first network node.

49. The system of claim 48, wherein said first and second network nodes are from the group comprising central processing units, computer hosts, computer servers, storage nodes, printer nodes, file systems and location independent file systems.

50. The system of claim 48, wherein said communication link is a local area network or a wide area network.

51. The system of claim 48, wherein said corresponding monitors periodically check their corresponding sub-processes executing on said first network node in order to detect a failure.

52. The system of claim 51, wherein said periodic checking comprises sending a key to said corresponding sub-process and receiving a predefined response.

53. The system of claim 51, wherein said periodic checking comprises monitoring heartbeat signals sent at a periodic rate.

54. The system of claim 51, wherein, when one of said corresponding monitors detects a failure, said one corresponding monitor initiates a sub-process swap, said sub-process swap comprising:
    terminating said failed sub-process from executing on said first network node;
    initiating said failed sub-process as a new sub-process executing on said second network node;
    initiating a new corresponding monitor on said first network node that monitors said new sub-process executing on said second network node; and
    terminating said one corresponding monitor executing on said second network node.

55. A system comprising:
    a first plurality of network nodes connected via a first communication link;
    a second plurality of network nodes connected via a second communication link;
    said first communication link and said second communication link connected through a third communication link,
    at least one application comprising a plurality of sub-processes resident on one of the network nodes and presently executing;
    a plurality of monitors for said plurality of sub-processes, each of said plurality of sub-processes having one corresponding monitor from said plurality of monitors, said plurality of monitors resident on one of the network nodes and presently executing,
    each corresponding monitor being configured for detecting failure of its corresponding sub-process and, if a corresponding sub-process has failed, causing said failed sub-process to execute on another of the network nodes as a new sub-process having a corresponding monitor while the remaining sub-processes continue to execute on said one network node where resident.

56. The system of claim 55, wherein said network nodes are from the group comprising central processing units, computer hosts, computer servers, storage nodes, printer nodes, file systems and location independent file systems.

57. The system of claim 55, wherein said first communication link, said second communications link and said third communication link are local area networks, wide area networks or a combination of both a local area network and a wide are network.

58. The system of claim 55, wherein said corresponding monitors periodically check said sub-process executing on said one node of said first plurality of network nodes in order to detect a failure.

59. The system of claim 58, wherein said periodic checking comprises sending a key to said sub-process and receiving a predefined response.

60. The system of claim 58, wherein said periodic checking comprises monitoring heartbeat signals sent at a periodic rate.

61. The system of claim 58, wherein, when one of said corresponding monitors detects a failure, said one corresponding monitor initiates a sub-process swap, said sub-process swap comprising:
    terminating said failed sub-process from executing on said one network node;
    transferring and initiating said failed sub-process as a new sub-process executing on another network node;
    initiating a new corresponding monitor on another network node that is not the same node as the node to which the failed sub-process was transferred, wherein said new corresponding monitors said new sub-process; and
    terminating said one corresponding monitor executing on said one network node.

62. The system of claim 61, wherein, if said failed sub-process initially executed on a network node connected to said first communication link, then said new sub-process execution is initiated on a network node connected to said second communication link.

63. The system of claim 61, wherein, if said failed sub-process initially executed on a network node connected to said second communication link, then said new sub-process execution is initiated on a network node connected to said first communication link.

64. The system of claim 61, wherein, if said one corresponding monitor initially executed on a network node connected to said first communication link, then execution of said new corresponding monitor is initiated on a node connected to said second communication link.

65. The system of claim 61, wherein, if said one corresponding monitor initially executed on a network node connected to said second communication link, then execution of said new corresponding monitor is initiated on a network node connected to said first communication link.

66. A method for operating a failover system, wherein failover does not require the termination of all the sub-processes executing on a first network node, the method comprising:
    executing at least one application comprising a plurality of sub-processes, said at least one application resident on the first network node;
    executing a plurality of monitors for said plurality of sub-processes, each of said plurality of sub-processes having one corresponding monitor from said plurality of monitors, said plurality of monitors resident on a second network node, said second network node connected to said first network node via a communications link;
    periodically checking the operation of said application, said periodic checking performed by said plurality of corresponding monitors;
    if an execution failure of a sub-process of said application is detected by its corresponding monitor, then
        terminating execution of said failed sub-process from executing on said first network node while the remaining sub-processes continue to execute on said first network node;
        transferring and initiating execution of said failed sub-process as a new sub-process on said second network node;
        initiating execution of a new corresponding monitor for said new sub-process on said first network node; and
        terminating said corresponding monitor of said failed sub-process from executing on said first network node.

67. The method of claim 66, wherein said first and second network nodes are from the group comprising central processing units, computer hosts, computer servers, storage nodes, printer nodes, file systems and location independent file systems.

68. The method of claim 66, wherein said communication link is a local area network or a wide area network.

69. A computer system for controlling failover so that the termination of all the executing processes is not required, the computer system comprising:
- a first network node and a second network node;
- a memory comprising software instructions that enable the computer system to perform:
    - executing at least one application comprising a plurality of sub-processes, said at least one application resident on the first network node;
    - executing a plurality of monitors for said plurality of sub-processes, each of said plurality of sub-processes having one corresponding monitor from said plurality of monitors, said plurality of monitors resident on a second network node, said second network node connected to said first network node via a communications link;
    - periodically checking the operation of said application, said periodic checking performed by said plurality of corresponding monitors;
    - if an execution failure of a sub-process of said application is detected by its corresponding monitor, then
        - terminating execution of said failed sub-process from executing on said first network node while the remaining sub-processes continue to execute on said first network node;
        - transferring and initiating execution of said failed sub-process as a new sub-process on said second network node;
        - initiating execution of a new corresponding monitor for said new sub-process on said first network node; and
        - terminating said corresponding monitor of said failed sub-process from executing on said first network node.

70. A computer software product for a computer system comprising a first network node and a second network node to control failover so that the termination of all the sub-processes executing on said first network node is not required, the computer program product comprising:
- software instructions for enabling the computer system to perform predetermined operations, and a computer readable medium bearing the software instructions, said predetermined operations comprising:
    - executing at least one application comprising a plurality of sub-processes, said at least one application resident on the first network node;
    - executing a plurality of monitors for said plurality of sub-processes, each of said plurality of sub-processes having one corresponding monitor from said plurality of monitors, said plurality of monitors resident on a second network node, said second network node connected to said first network node via a communications link;
    - periodically checking the operation of said application, said periodic checking performed by said plurality of corresponding monitors;
    - if an execution failure of a sub-process of said application is detected by its corresponding monitor, then
        - terminating execution of said failed sub-process from executing on said first network node while the remaining sub-processes continue to execute on said first network node;
        - transferring and initiating execution of said failed sub-process as a new sub-process on said second network node;
        - initiating execution of a new corresponding monitor for said new sub-process on said first network node; and
        - terminating said corresponding monitor of said failed sub-process from executing on said first network node.

* * * * *